(12) United States Patent
Lue-Sang et al.

(10) Patent No.: US 8,006,250 B1
(45) Date of Patent: Aug. 23, 2011

(54) CREATING AN OBJECT IN AN OBJECT-ORIENTED PROGRAMMING PLATFORM

(75) Inventors: Ronald D. Lue-Sang, Mountain View, CA (US); Ali T. Ozer, Redwood City, CA (US); Mark A. Piccirelli, Los Gatos, CA (US); Andreas W. Wendker, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 2097 days.

(21) Appl. No.: 10/873,667

(22) Filed: Jun. 22, 2004

(51) Int. Cl.
*G06F 3/00* (2006.01)
*G06F 13/00* (2006.01)

(52) U.S. Cl. .................................. 719/315; 707/999.103

(58) Field of Classification Search .................. 719/315; 707/103 R
See application file for complete search history.

(56) References Cited

U.S. PATENT DOCUMENTS

| | | | |
|---|---|---|---|
| 5,898,871 A * | 4/1999 | Williamson et al. | 719/315 |
| 6,427,231 B1 | 7/2002 | Burke et al. | 717/116 |
| 2001/0052032 A1 * | 12/2001 | Williamson et al. | 709/315 |
| 2002/0174262 A1 | 11/2002 | Marcos et al. | 709/315 |
| 2003/0115379 A1 * | 6/2003 | Burton et al. | 709/330 |
| 2004/0098406 A1 | 5/2004 | Roddy | 707/103 |

* cited by examiner

*Primary Examiner* — Hyung S Sough
*Assistant Examiner* — Kimberly Jordan
(74) *Attorney, Agent, or Firm* — Williams, Morgan & Amerson, P.C.

(57) ABSTRACT

An application programming interface is provided in an object-oriented programming platform for developing applications. A method comprises, in response to a first message received at a first object that contains one or more properties, creating a second object that responds to a second message sent thereto responsive to sending of the first message to the first object and returning the second object. By returning, for example, key-value collection proxies by specific key-value coding methods a read-only or a read-write access may be allowed to a collection of a container object's related objects. A specific implementation of one object's class may change over time without requiring changes in another object's implementation.

38 Claims, 8 Drawing Sheets

CREATING AN OBJECT IN AN OBJECT-ORIENTED PROGRAMMING PLATFORM

FIELD OF THE INVENTION

The invention generally relates to computer programming technique to operate object-oriented software programs, and more particularly, to providing an application programming interface in an object-oriented programming platform to create an object.

DESCRIPTION OF THE RELATED ART

Many computer programming languages are used for development of software programs. Object-oriented programming is popular since it offers programming flexibility with a relatively simple structure. Object-oriented programming is a simple way of creating software programs using building blocks, and forming relationships for these building blocks. Such building blocks in object-oriented computing systems are generally called "objects." An object is a programming unit or a software entity that combines a data structure (e.g., instance variables) with the operations that can operate on that data. In object-oriented programming, these operations that can be performed on the data are generally called "methods."

For example, an object-oriented program comprises a collection of software entities known as objects, each of which is responsible for performing a particular task. Every object is characterized by associated properties, or data values, and one or more methods that provide certain behavior or functionality. In operation, one object invokes the methods of another object, to cause the second object to exhibit its associated behavior.

Using objects, an object-oriented software application may define its data and the methods that operate on the data. An object may communicate with another object by sending messages. For example, when one object desires to operate on data that resides in another object or needs to execute methods in another object, it sends a message. The requesting object identifies the intended operation by specifying a method. The requesting object can further send arguments that may be used by the responding object in performing the named method. The responding object performs the method requested in the message. In this manner, the data provided by the requesting object may be used to perform the indicated operation by the method.

When a programmer defines a method, he or she specifies the classes or identities of the arguments appropriate for the method. A class is a programming language concept that allows data and methods to be grouped together. The class concept is fundamental to the notion of an object-oriented programming language. The methods of a class define the set of permitted operations on the class's data (its attributes). This close tie between data and operations means that an instance of a class—an object—is responsible for responding to messages defined by its class. As a basic building block of object-oriented programming, classes define types of objects by specifying their properties (data) and the procedures ("methods") they support.

Programming in an object-oriented computing system requires the programmer to build a structure for the set of objects, which defines how properties and methods are to be manipulated. For example, developing applications with user interface programming, such as two-dimensional drawing techniques require efficient observation information storage and manipulation when working with objects. However, designing such a structure can not only be a complex and difficult task but a relatively inefficient one because of the overhead associated with object interactions, sending a large number of messages and notifications back and forth between the objects.

In developing applications, such as with user interface programming, an indirect access to an object's properties may be needed. Key-value coding (KVC) is one mechanism by which an object can get or set the value of a property of another object, identifying that property only by a key string. However, different kinds of access including read-only or read-write access to a collection of some container object's related objects may be needed when developing applications with user interface programming. Moreover, when a first object requires access to a second object's collection of related objects, a relatively large number of methods may need to be implemented by the object B's class. The specific implementation of the second object's class may change over time, however, requiring changes in the first object's implementation.

The present invention is directed to overcoming or at least reducing one or more of the problems set forth above.

SUMMARY OF THE INVENTION

In one aspect of the instant invention, a method is provided for providing an application programming interface in an object-oriented programming platform. The method comprises, in response to a first message received at a first object that contains one or more properties, creating a second object that responds to a second message sent to it responsive to sending the first message to the first object, and returning the second object.

In another aspect of the instant invention, an article comprising a computer readable storage medium storing instructions is provided. The instructions that, when executed cause a processor-based system to, in response to a first message received at a first object that contains one or more properties, create a second object that responds to a second message sent to it responsive to sending the first message to the first object and return the second object.

In yet another aspect of the instant invention, an object-oriented computing system is provided. The system comprises a processor, a memory coupled to the processor, the memory storing a data file structure including an identification of a first and a second object in a software program, the second object contains one or more properties, and an interface to, in response to a first message received at a first object that contains one or more properties, creating a second object that responds to a second message sent to it responsive to sending the first message to the first object, and returning the second object.

In still another aspect of the instant invention, an application programming interface for managing relationships of objects in an object-oriented computing system is provided. The application programming interface comprises means for, in response to a first message received at a first object that contains one or more properties, creating a second object that responds to a second message sent to it responsive to sending the first message to the first object, and means for returning the second object.

BRIEF DESCRIPTION OF THE DRAWINGS

The invention may be understood by reference to the following description taken in conjunction with the accompanying drawings, in which like reference numerals identify like elements, and in which.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provides for an application programming interface for use with an object-oriented computing system. The application programming interface uses a key-value coding mechanism which provides for executing an object's properties indirectly. That is, using strings to identify properties, rather than through invocation of an accessor method or as instance variables. In this manner, a container object may customize a relationship, as one or more objects become related or unrelated to the container object, using automatic key-value coding (KVC) collection proxy objects which get returned in response to specific KVC methods, as described later. That is, in one embodiment, an application programming interface enables optimization of object interaction in an object-oriented programming platform using the KVC methods and KVC collection proxy objects.

Figure 1:
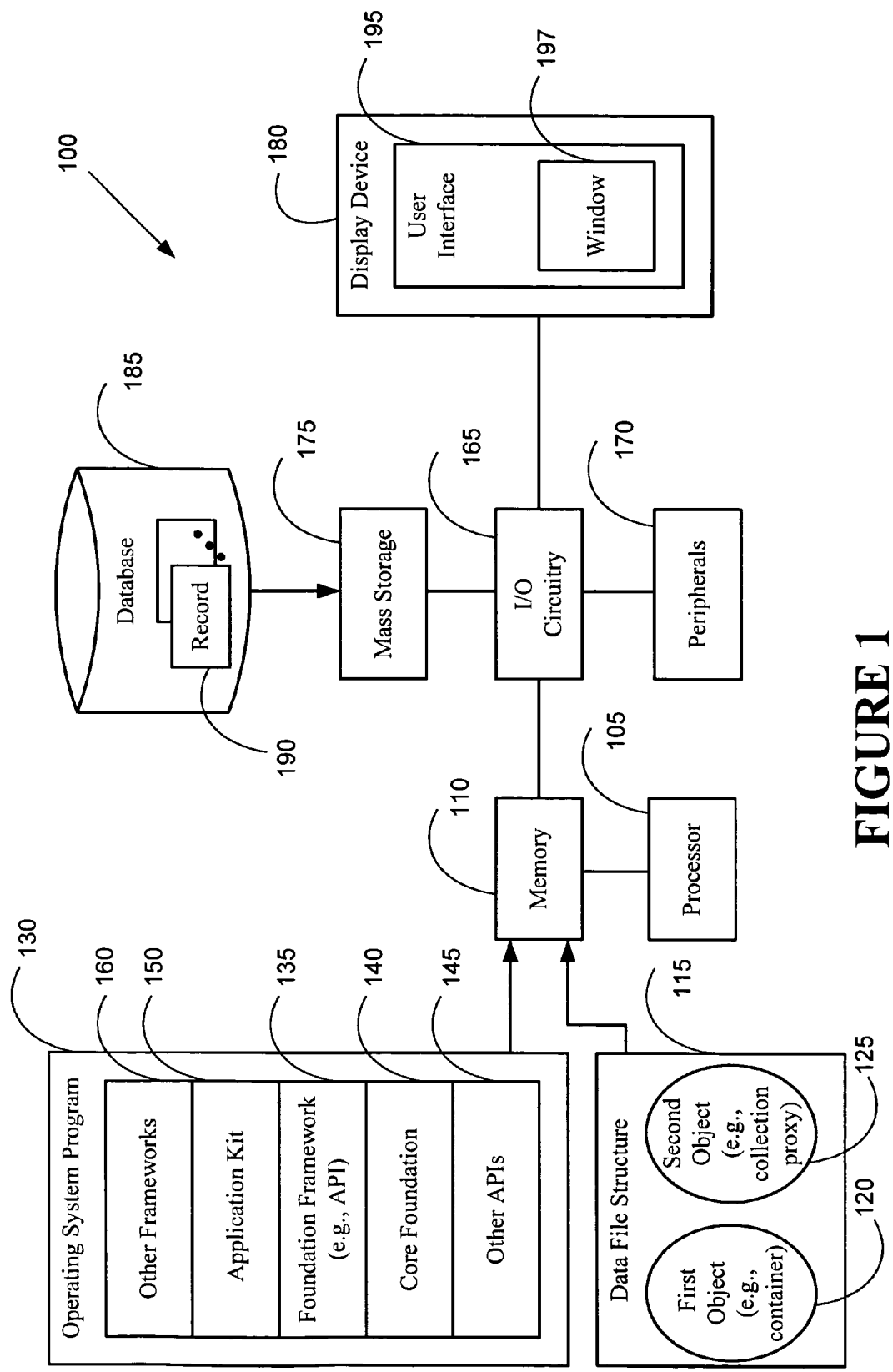
FIG. 1 illustrates an object-oriented computing system according to one illustrative embodiment of the present invention.

Referring to FIG. 1, an object-oriented computing system 100 is shown according to one embodiment of the present invention. The object-oriented computing system 100 may comprise a processor 105 coupled to a memory 110 storing a data file structure 115 including an identification of an observer object 120 and an observed object 125 in a software program, such as an operating system program 130. The memory 110 may store one or more properties and a set of methods associated with the respective observer object 120 and the observed object 125. The operating system program 130 may provide instructions for registering the observer object 120 with the observed object 125 to observe one or more properties thereof.

In one embodiment, the operating system program 130 may comprise a plurality of application programming interfaces (APIs) which may be separated into frameworks. These frameworks may include a Foundation framework 135 that resides on a CoreFoundation framework 140. While the Foundation framework 135 may enable a binding feature for objects in an object-oriented environment, the CoreFoundation framework 140 implements conventional APIs. The CoreFoundation framework 140 may reside on other APIs 145, such as standard UNIX-based APIs. Over the Foundation framework 135, an application kit (AppKit) framework 150 may reside. Other frameworks may reside over the AppKit framework 150.

In Macintosh Operating System (Mac OS), such as Mac OS X, application programming interfaces (APIs) are divided into frameworks including the Foundation framework 135 which supports the AppKit framework 150. The Foundation framework 135 and the AppKit framework 150 may be implemented in any of several available programming languages, such as Objective-C, an object-oriented programming language. This Foundation framework 135 may be used with a binding feature introduced earlier. However, the Foundation framework 135 may be used with other features available to an Operating System environment. In the Foundation framework 135, a class hierarchy is based on a single super class called an object class.

In the Objective-C language, for example, a class defines the methods and instance variables for a particular kind of object. A class definition declares instance variables and defines methods for all members of the class. Objects that have the same types of instance variables and have access to the same methods belong to the same class. In the Objective-C language, a class object or object class is an object that represents a class and knows how to create new instances of the class. Class objects are created by the compiler, lack instance variables, and can't be statically typed, but otherwise behave like all other objects. As the receiver in a message expression, a class object is represented by the class name. In the Objective-C language, a class method is a method that can operate on class objects rather than instances of the class.

The memory 110 may couple an input/output (I/O) circuitry 165 to the processor 105. In turn, the I/O circuitry 165 may couple one or more peripherals 170, a mass storage device 175, and a display device 180, to the memory I/O in one embodiment. The mass storage device 175 may store a database 185 in which each object of the observer object 120 and the observed object 125 forms the basis for a record 190. Each record 190 may contain fields which respectively identify the pointers and the methods with which the record is associated.

In the display device 180, the object-oriented computing system 100 may provide an interface 195 to replace a first implementation of a method in the set of methods of the observed object 125 with a second implementation of the method that automatically invokes a notification to the observer object 120 from the observed object 125. Instead of an automatic observer notification, manual notifications may be provided in some embodiments of the present invention. The notifications are sent directly to the observer object 120 when changes are made to specific properties of the observed object 125. To provide an automatic observing capability for objects, a window 197 may be displayed on the displayed device 180 of the object-oriented computing system 100.

Figure 2:
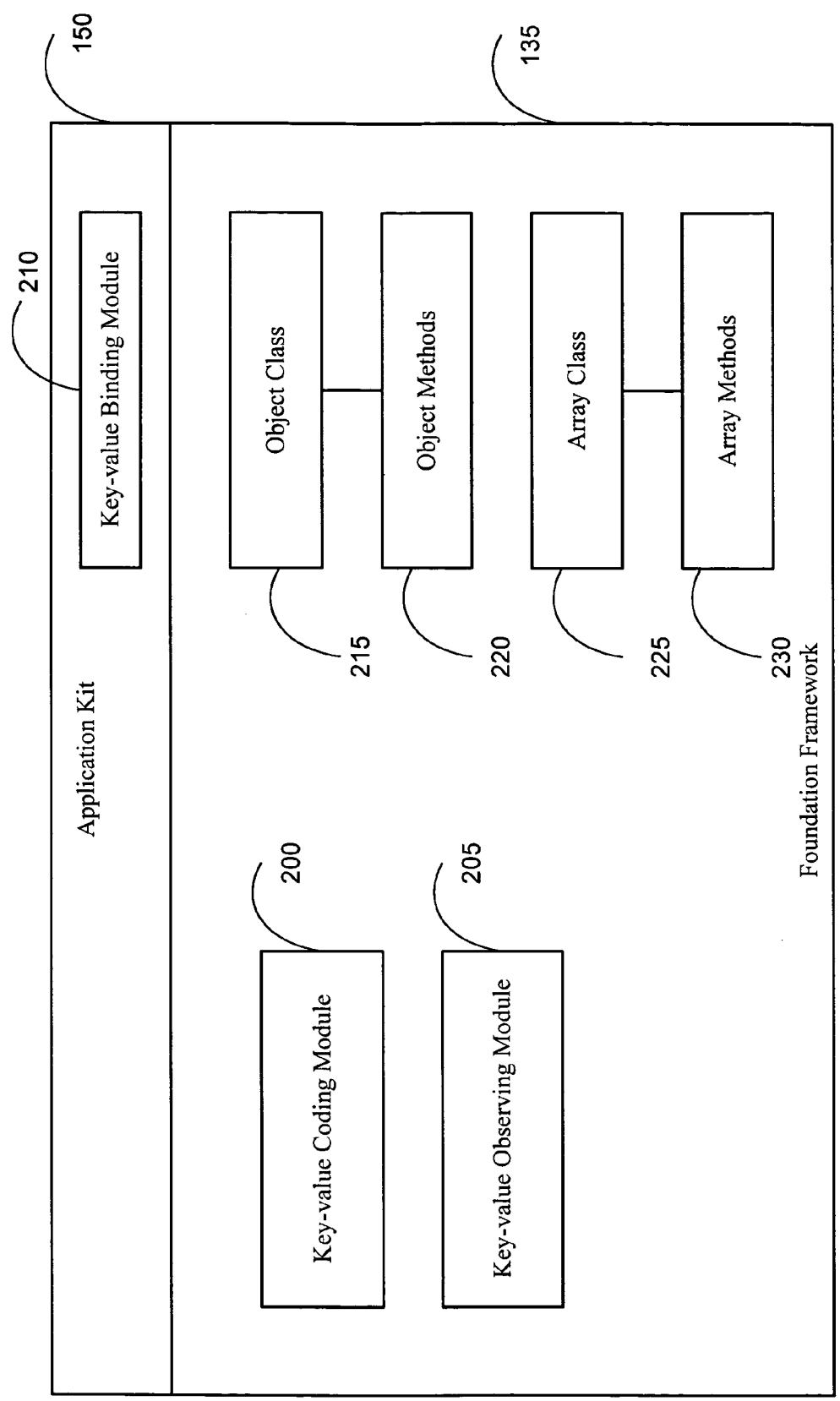
FIG. 2 illustrates an application programming interface for use with the object-oriented computing system shown in FIG. 1 in accordance with one illustrative embodiment of the present invention.

Turning now to FIG. 2, an application programming interface (API) in the form of the Foundation framework 135 is shown according to one embodiment of the present invention. The Foundation framework 135 comprises a key-value coding module 200 and a key-value observing module 205. The AppKit framework 150 comprises a key-value binding module 210. The key-value coding module 200 gives access to object properties using a very generic application programming interface (API) that identifies them by a key. In one embodiment, a key is a string, such as "graphics," or "fillColor." An object property may be an attribute, to-one relationship, or to-many relationship. The attribute may be a simple immutable value, for example, the fillColor or stroke width of a Sketch graphic. A to-one related object may have properties of its own, e.g., the image of a Sketch image graphic. The to-many related objects may be a collection of related objects, e.g., graphics of a Sketch document.

Using the key-value coding module 200 and the key-value observing module 205, the key-value binding module 210 provides an application programming interface that allows the value of an object's property to be tied to the value of another object's property. In this manner, the object that supports this binding feature may provide custom options, providing plenty of flexibility in implementation.

For the key-value observing module 205, which is an application programming interface, the classes of the objects must be key-value observing (KVO)-compliant (observable) for other objects to bind to them. That is, either using manual observer notification or an automatic observer notification, the objects may be made KVO compliant. While invocations of key-value coding (KVC) methods may result in observer notifications, the notifications of KVC—compliant methods may result in observer notifications as well.

The Foundation framework 135 may further comprise an object class 215 and a set of associated object methods 220. In addition, the Foundation framework 135 may comprise a standard collection class, such as an array class 225 having a set of associated array methods 230, in one embodiment. In the Foundation framework 135, besides the object class 215 the array class 225 may be provided. The array class 225 encapsulates an array of objects. While the object methods 220 for the object class 215 may include a method "value for key" which returns the value of the "key" property, the array methods 230 include a first method called "add observer: to objects at indexes: for key path: options: context:" and "remove observer: from objects at indexes: for key path:"

In one embodiment, the "value for key" method searches for the object class 215 for a method of the same name, and invokes it. The "value for key" method also returns the value of the key property for to-many relationships where the related objects are not stored in the array class 225. The object methods 220 may further include a "set value: for key" method which sets the value of the key property for to-many relationships where the related objects are not stored in the array class 225. The object methods 220 may further include a "set value: for key" method which sets the value of the key property. Again, the "set value: for key" method, searches, the object class 215 for a method whose name matches, and invokes it.

The object methods 220 may include a "validate value: for key: error" method, which either returns a value good for a set value: for key method or returns an error, separating validation rules from decision about when to validate. Likewise, the object methods 220 may include a "mutable array value for key" method which returns a mutable array of to-many related objects. For each object method 220 there is a variant that uses a key path being a dot—separated list of keys which get handled automatically.

Using the key paths, the key-value coding module 200, enables key-value binding and key-value observing in terms of key paths. For making the object class 215 and the array class 225 KVC-compliant, the object methods 220 and the array methods 230 include methods "value for key" and "set value: for key." For each attribute or to-one relationship, method name "key" and for read write a method named "set key" may be implemented. For each to-many relationship, likewise, a method named "key", "count of key", and "object in key at index" may be implemented. For each mutable to-many relationship, a method called "insert object: in key at index" and a method called "remove object from key at index" may be implemented. In all of the above indicated methods, the word "key" in each method name may be replaced by the actual key.

The key-value observing (KVO) module 205 may be built on the key-value coding (KVC) module 200. Using the key-value coding module 200, a message may be sent to an object without the knowledge of a name of a method in the object's class 215 before getting and setting the values of the attributes in that object. The key-value coding module 200 comprises a value for key method and a set value for key method. The value for key method takes one argument and the key is a string. The string is the key of the properties whose value is desired. In this way, properties of an object may be extracted without knowing how the object's class 215 implements the property getting and setting.

When the value for key method is invoked, the key-value coding module 200 searches for a method in the object's class whose name is "key." If the key method is not located, then the key-value coding module 200 searches for another method called "get key."

Accordingly, if a method is not found, the key-value coding module 200 searches for instance variables for the object. For example, when sending an employee object a value for key method where key is "manager", the key-value coding module 200 attempts to execute a method named manager and if the manager method is determined to be not present, then the key-value coding module 200 searches for an instance variable whose name is "manager." The key-value coding module 200 obtains a value from the instance variable of the manager object and returns the value. In this way, the key-value coding module 200 protects clients from having to know how the properties are implemented, providing implementation freedom to key-value coding module 200 compliant classes because an instance variable is hidden behind a method.

In general, the key-value observing module 205 is built on the key-value coding module 200. One of the features of a method called "set value for key", which is part of the key-value coding module 200, is that if a method cannot be found whose name matches the pattern, the "set value for key" method may search for an instance variable whose name matches the pattern. In this event, the "set value for key" method will change the value of the instance variable directly. When the "set value for key" method is invoked, an automatic key value observing (KVO) notification feature operates. The key-value coding module 200 is made aware of the key-value observing module 205, e.g., if the key-value coding is going to change the value of the instance variable directly, a "will change value for key" method before the key value is changed and a "did change value for key" method after the key value is changed are called. Thus, an automatic key-value observer notification in response to key-value coding messages is provided.

A property may be changed in at least two ways. In the first way, an accessor method, such as a set key method may be called. In the second way, a generic method may be called which identifies the property of the key, i.e., a set value for key.

A relationship may be mutated using a mutable array value for key method, e.g., when one object is mutating another object, i.e., adding or removing objects from one of the objects to-many relationships may occur. For example, by calling the mutable array value for key method, to-many relationships of an object may be changed, e.g., the number of employee objects related or unrelated to the manager object may be altered. The mutable array value for key method returns, an instance of a standard array class, to add, remove or replace objects in the array by automatically relating and unrelating objects to the container object that was originally sent the mutable array value for key message. While automatic relating and unrelating of objects continues, automatic KVO notifications may be generated. In this manner, one or more properties of an object may be changed by a specific method implemented by the object's class directly or by a generic method based on the key-value coding module 200, while the automatic KVO notifications may be generated for both of these methods.

The array class 225 may have associated therewith a plurality of array methods 230, e.g., a couple of dozen methods in one embodiment. These array methods 230 may be implemented in terms of two primitive methods including a "count of key" method and an "object in key at index" method, for example. Therefore, when an object calls for a value of key, and gets back a collection proxy object that is an array, it gets to send a wide variety of messages to the array. For example, response to these messages uses a "count of employees" method and an "object in employee at index" method which are sent to a container object. Thus, a client, i.e., code of an object which calls a "value of key" method may operate upon a return response in different ways but the object that has to be key-value coding compliant for to-many relationships only implements the two primitive methods, as described above.

In the Foundation framework 135, a plurality of collection classes includes the array class 225 which is immutable. Each collection class comprises a mutable and an immutable variance. The mutable variant is a subclass of the immutable variant. For example, a mutable array class may be a subclass of the array class 225. While a value for key method operates by finding one or more methods that corresponds to the primitive methods of the array class 225, a mutable value for key method, operates by returning a mutable array object when one object invokes this method on another object. The mutable array object implements methods of the mutable array class.

Once for a mutable value for key method, a mutable array object is returned, different methods including insert objects, remove objects, or replace objects may be invoked in the mutable array object. For example, a mutable collection proxy object responds to messages like "-insertObject:atIndex:" (defined by a mutable array class). It responds to such messages by sending an "-insertObject:inKeyAtIndex:" message to the original recipient of "-mutableArrayValueForKey:."

In this manner, the object, which desires to mutate a relationship, uses an existing class for inserting, removing, or replacing an object. However, the owner of the to-many relationships, e.g., for the manager object, the manager class implements only two primitive collection mutation methods.

In order for an object to be a key-value coding (KVC) compliant for to-many relationships, the object implements the object methods 220 called "count of key", "object in key at index," "insert object: in key at index," and "remove object from key at index" where "key" gets replaced by the name of a relationship, such as a relationship of a manager object to multiple employee objects. Alternatively, to be key-value coding compliant for a to-many relationship, an object may implement a method named after a relationship. To allow mutation of such a relationship, the object may implement a method called "set key." The mutable collection proxy object that is returned invokes, when appropriate, the "set key" method if it is implemented even though the "insert object: in key at index" and "remove object from key at index" methods are not implemented. When a mutable collection proxy object must invoke a "set key" method it obtains the original value of the to-many relationship, which may be an array, i.e., a collection of related objects. It then makes a mutable copy of the array, mutates it by inserting, removing, or replacing objects, and then sets the mutated array back in the original first or container object 120, by invoking the "set key" method. As a result, relatively less code may need to be written by developers of container classes.

Because the key-value coding module 200 hides the implementation details of the first or container object 120, if an object implements a "get" method and a "set" method and encounters unacceptable performance issues, the "set" method may be replaced with explicit "insert" and "remove" methods. If another object calls for a mutable value for key, the calling object experiences no difference between the two different implementations, i.e., a change in the container class implementation causes no difference to the calling object.

Figure 3:
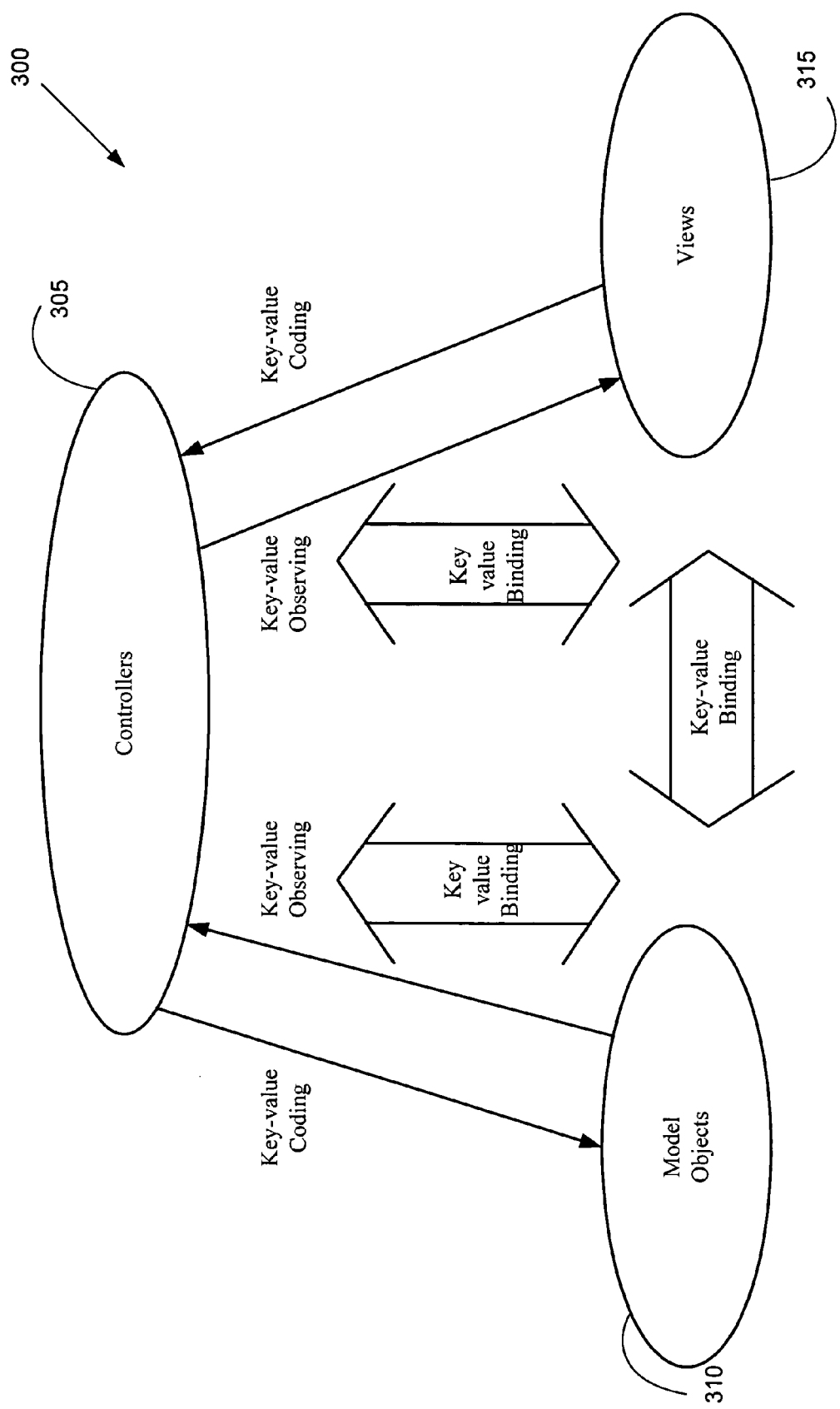
FIG. 3 illustrates a model-view-controller architecture for user interface programming of the application programming interface shown in FIG. 2 according to one illustrative embodiment of the present invention.

Referring to FIG. 3, a model-view-controller architecture 300 for user interface programming is depicted for the object-oriented computing system 100 shown in FIG. 1 according to one embodiment of the present invention. The model-view-controller architecture 300 may comprise one or more controllers 305, one or more model objects 310 and associated views 315. The controllers 305 may be classes, such as array controller class, object controller class, and user defaults controller class. The model objects 310 may be objects that are KVC-compliant for other objects to bind to them. An example of the views 315 may be a table view.

The key-value coding module 200 enables the views 315 to get and set values in the controller's 305. In addition, the key-value coding module 200 enables the controllers 305 to get and set values in the model objects 310. The key-value observing module 205 enables the views 315 be notified of changes to values in the controllers 305. Moreover, the key-value observing module 205 enables the controllers 305 be notified of changes to values in the model object 310. The key-value binding module 210 binds the named properties of the views 315 and the controllers 305 to the properties in the controllers 305 and the model object 310. This binding enables observing using the key-value observing module 205. The binding also enables updating of bound-to values in response to user actions using the key-value coding module 200.

For example, a table view's contents may be bound to an array controller's "arranged objects." The array controller's contents array may in turn be bound to a to-many relationship of a model object. In this manner, the array controller class may manage the life cycle of an array of objects. For instance, the KVO notifications from the model objects 310 may cause KVO notifications to the corresponding table views 315.

As one example, for a class called "an array controller" a table view may be bound to it, i.e., the table view receives values from the array controller class. The array controller class may be bound with a to-many relationship to other objects. Because of this binding of the contents of the array controller class, the array controller class passes the related objects to the table view using the key-value coding module 200 and the key-value observing module 205. In this manner, the array controller class may potentially observe the related objects.

The array controller class may include a feature, i.e., when a user selects many objects in the table view, the feature exposes a property called "selection" for values that are common to each of the rows in the table view. Based on a master-detail relationship, an inspector window, such as the window 197 may show properties of the selected objects because the array controller class observes each of the related objects. If all of the related objects have an exact same value, then that value appears in the inspector window for a property. Otherwise, if for selected rows of the table view the related objects possess different values, then in the inspector window a place holder appears, indicating the presence of multiple values in a user interface. For registration and deregistration as an observer of the related objects, the array controller class may accomplish common overhead associated with observer registration and deregistration once for the related objects and apply the same over again and again to each observed object.

Using the array controller class, the key-value binding module 210 may bind the "selection indexes" of a table view to an array controller's "selection indexes". Likewise, the properties of user interface controls may be bound to a key path, such as "selection.modelKey". Changes to the selection indexes may cause KVO notifications for every substantially observed key path selection.modelKey. In addition, the key-value binding module 210 may bind the properties of user interface controls, to "selection.modelKey" of an object controller class. The key-value binding module 210 may bind the object controller's "object relationship" to a to-one relationship of a model object, or another controller. In this manner, the object controller class may manage the life cycle of an object. Using the key-value binding module 210, a user defaults controller class may bind the values of user interface controls to "value.preferencesKey" of a user defaults controller. The user defaults controller class provides an easy access to up-to-date preferences values via the key-value observing module 205 to other parts of an application.

Figure 4:
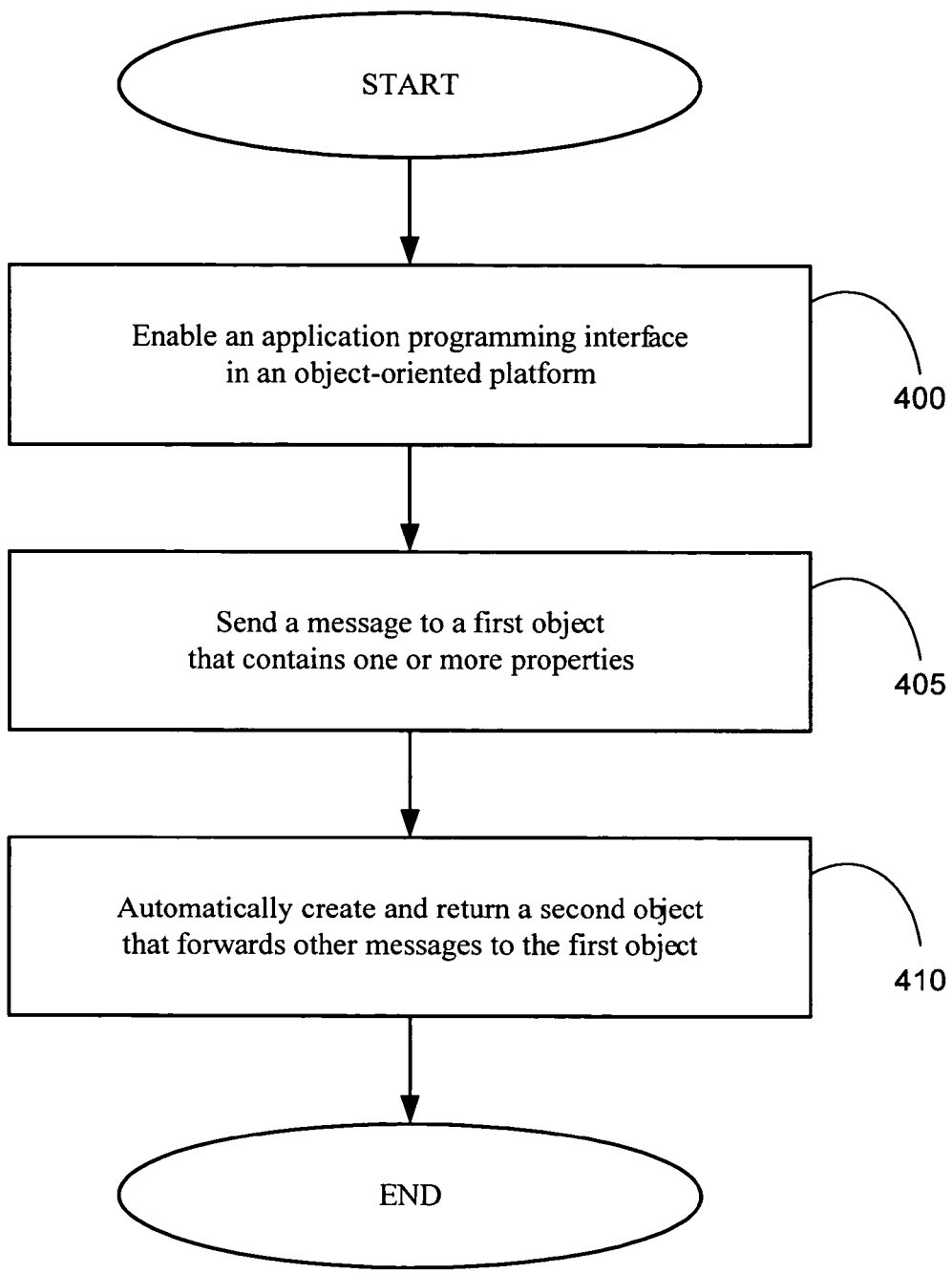
FIG. 4 illustrates a stylized representation of a method for automatically creating and returning an object (e.g., a collection proxy object) in response to a message sent to another object (e.g., a container object) using an application programming interface in the object-oriented computing system shown in FIG. 1 in accordance with one illustrative embodiment of the present invention.

Referring to FIG. 4, a method may use an application programming interface (API) in the object-oriented computing system 100 shown in FIG. 1 to provide an object in response to a message sent to another object according to one embodiment of the present invention. At block 400, an application programming interface, such as the Foundation framework 135 and the AppKit framework 150 shown in FIG. 2 may be enabled in an object-oriented programming platform on the object-oriented computing system 100, executing the operating system program 130.

Using the key-value coding module 200, an object may get or set the value of a property of another object, identifying that property only by a key, which may be a string. At block 405, a first message may be sent to a first object (e.g., a container object) that contains one or more properties. At block 410, the key-value coding module 200 may automatically create and return a second object (e.g., a temporary collection proxy object) that responds to the first message by sending one or more second messages to the first object. In this manner, using the key-value coding module 200, key-value coding collection proxy objects may be returned by specific key-value coding methods including a method called "value for key" or a method called "mutable array value for key". Accordingly, access to the collection of a container object's related objects may be provided in some embodiments of the present invention.

In one embodiment, the key-value coding module 200 may automatically create and return a temporary collection proxy object in response to a message sent to a container object. The container object may have other properties. The collection object may be an array. For example, if one of the relationships of a manager object is to its employee objects, the list of related employees to the manager may be collected in an array. The collection proxy object forwards messages to another object, such as an array since some code may desire to obtain count of the array or obtain an object of a specific index in the array.

Figure 5:
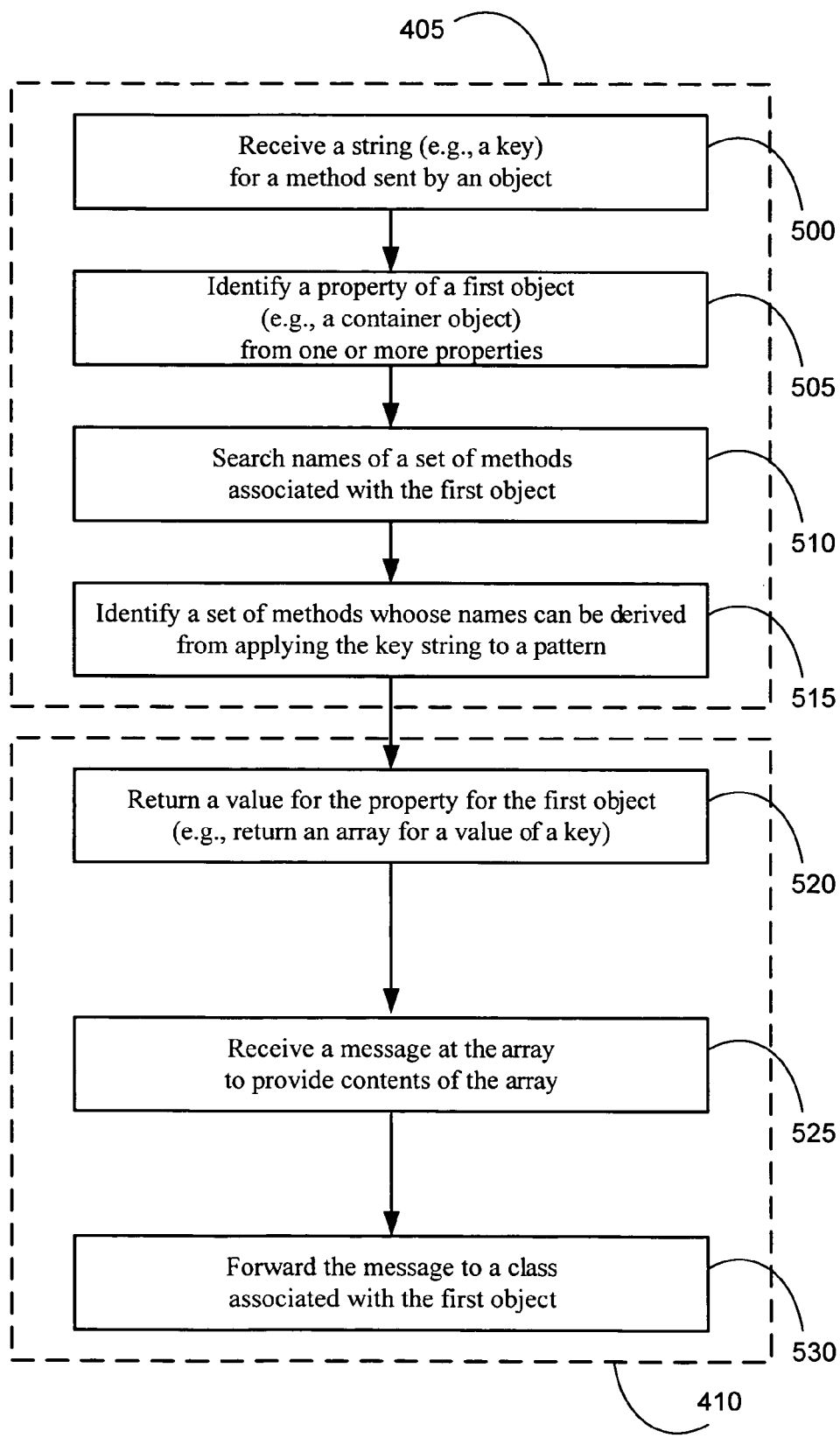
FIG. 5 illustrates a stylized representation of a method for generating collection proxies by key-value coding methods according to one embodiment of the present invention.

Referring to FIG. 5, a method for generating collection proxies by key-value coding methods is depicted in accordance with one embodiment of the present invention. Sending a message to the first object 120, such as the container object shown in FIG. 1, as indicated at block 405 in FIG. 4, may include receiving a string (e.g., for a method sent by an object), at block 500. At block 505, the key may identify a property of the first object 120 from one or more properties thereof. Names of a set of methods associated with the first object 120 may be searched at block 510. A set of methods whose names can be derived from applying the key string to one or more patterns may be identified at block 515.

Automatically creating and returning the second object 125 (e.g., a collection proxy object), as shown in the block 410 in FIG. 4, may involve returning a value for the property for the first object 120 (e.g., a container object), as indicated in block 520. For example, an array may be returned for a value of a key, in some embodiments of the present invention. A message may be received at the array to provide contents thereof, as shown in block 525. The message may be handled by sending other the first object 120, as indicated in block 530.

Figure 6:
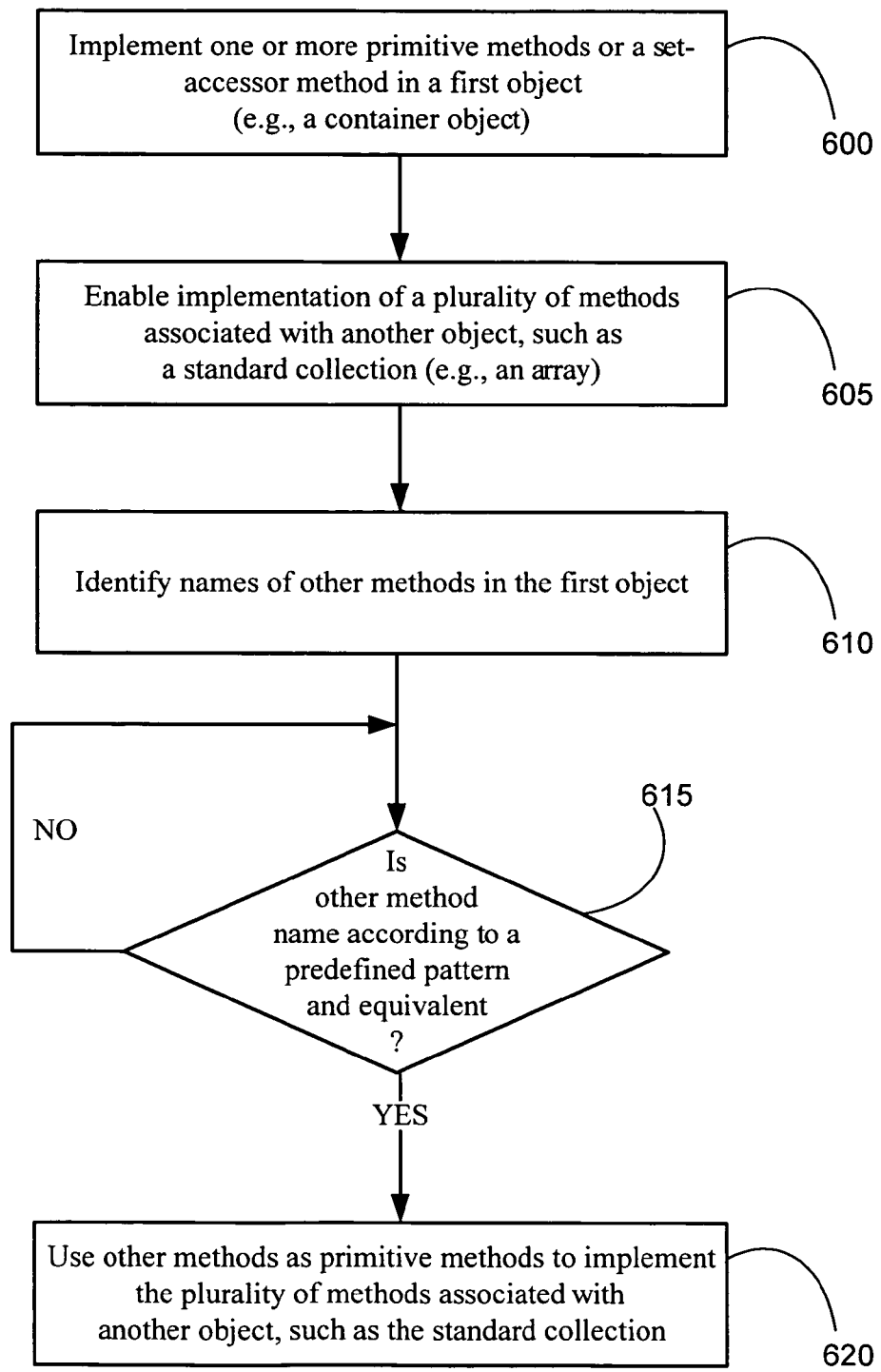
FIG. 6 illustrates a stylized representation of a method for responding to a mutating message declared by a standard collection class in accordance with one embodiment of the present invention.

Referring to FIG. 6, a method for responding to a mutating message declared by a standard collection class is shown in accordance with one embodiment of the present invention. At block 600, one or more primitive methods or a set-accessor method may be implemented in the first object 120 (e.g., a container object). Implementation of a plurality of methods corresponding to those associated with another object, such as a standard collection (e.g., an array) may be enabled at block 605. Names of these other methods may be identified in the container object's class at block 610. At a decision block 615, the names of the other methods may be analyzed to determine whether these names follow a predefined pattern and are equivalent to the primitive methods. If so, these other methods may be used as primitive methods to implement the plurality of methods associated with the standard collection at block 620.

In operation, the key-value coding module 200 provides a "value for key" method, which is a generic method that given a key (i.e., a string) that identifies a property, returns a value for the property for the object on which the generic method is invoked. In addition to searching for methods where method names are same as the key (e.g., the address property of a person object), the key-value coding module 200 also searches for methods whose name follow a naming pattern. In one example, a manager class may have a to-many relationship to a plurality of employee objects and implements a method called "count of employees" an object in the employee's index, following the naming pattern. When another object sends a manager object a value for key message, an array is returned which provides contents from the manager object.

Using the key-value coding module 200, e.g., when an object calls the manager object for a value of a key, where the key is "employees," an array is returned. If a count message is sent to the array to get a count of elements of the array, the count message is forwarded to the manager class as a method named "count of employees." Likewise, a message "object at index," sent to the key-value coding module 200 (e.g., implementing a collection proxy mechanism) becomes "object in employee at index" and gets forwarded to the manager object.

A value for key method in addition to looking for methods whose name follow a pattern "count of key" and "object in key at index" may also look for a method whose name follows a pattern "get key: range" which corresponds to one of the methods in an array class. If the method "get key: range" is provided, the collection proxy returned by "value for key" or "mutable array value for key" may invoke it to obtain several object pointers out of the array at once. However, when the "get key: range" method is not provided, the collection proxy returned by "value for key" or "mutable array value for key" may invoke the "object in key at index" method. Likewise, for a mutable value for key when an object sends a collection proxy object a "replace object at index with object" method gets implemented automatically. When the class of the container does not implement a "replace object at index with object" method, an old object being replaced is removed and a new object is inserted that is replacing the old object.

Figure 7:
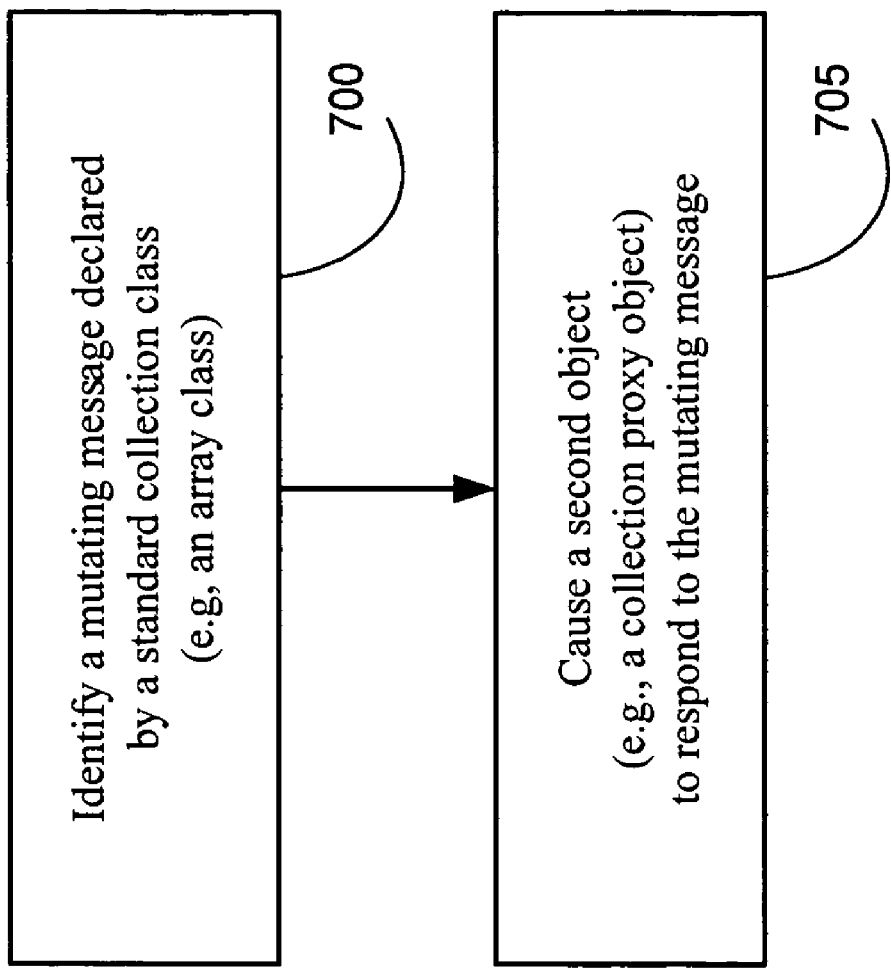
FIG. 7 illustrates a stylized representation of a method for handling a mutating message according to one embodiment of the present invention.

Referring to FIG. 7, a method for handling a mutating message is shown in accordance with one embodiment of the present invention. At block 700, a mutating message declared by a standard collection class may be identified. At block 705, the second object 125, such as a collection proxy object may respond to the mutating message. That is, the collection proxy object responds to the mutating message declared by the standard collection class. For example, the array collection class declares primitive methods like "-insertObject:atIndex:" and "-removeObjectAtIndex:." To take advantage of KVC collection proxy feature (and therefore be KVC-compliant for a specific property identified by key), the container class must implement methods whose names follow the pattern "-insertObject:inKeyAtIndex:" and "-removeObjectFromKeyAtIndex:" (or just -setKey:, as described before).

Figure 8:
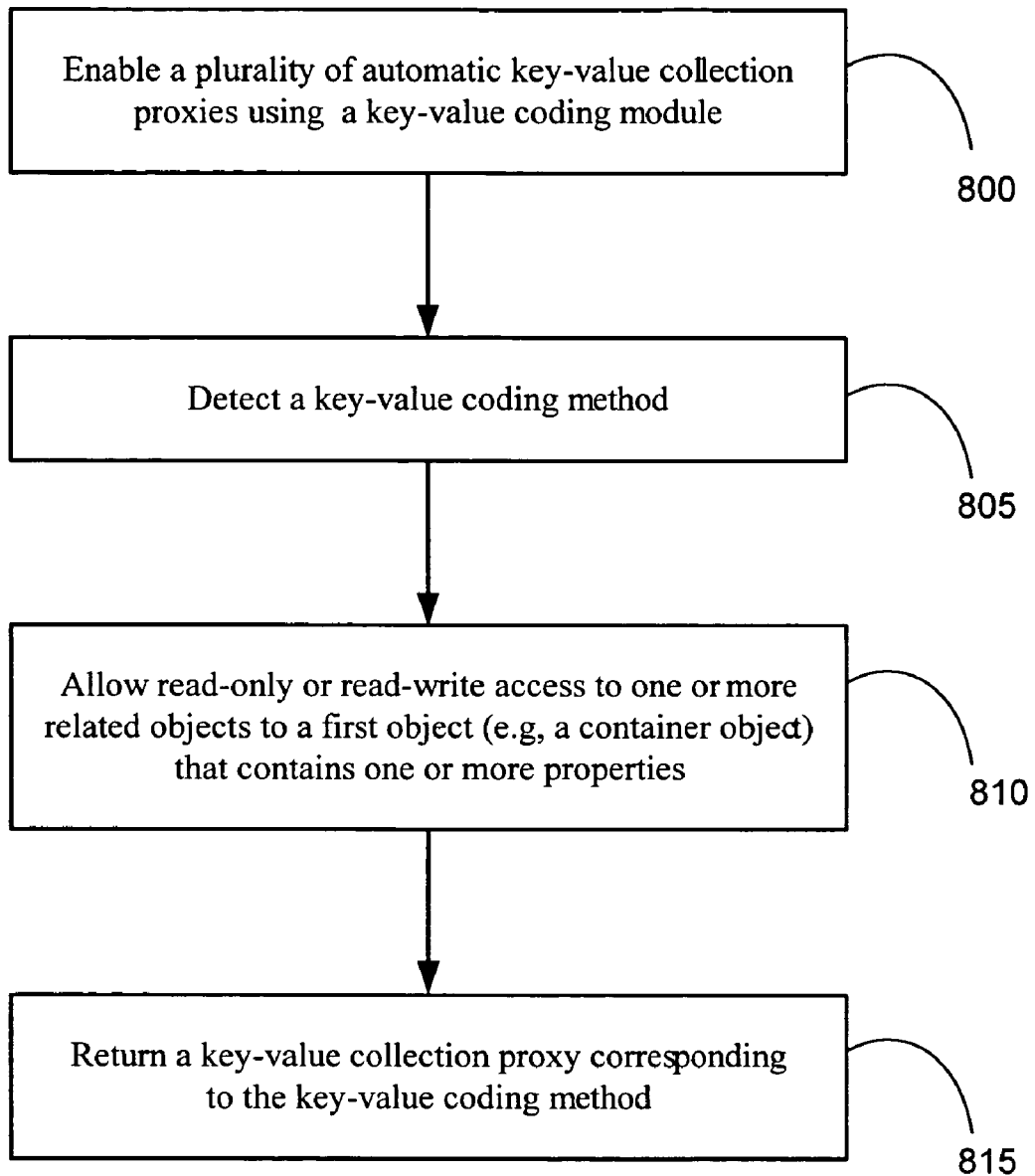
FIG. 8 illustrates a stylized representation of a method for returning key-value collection proxies by specific key-value coding methods to allow a read-only or a read-write access to the collection of a container object's related objects in accordance with one illustrative embodiment of the present invention.

Referring to FIG. 8, a method for returning key-value collection proxies by specific key-value coding methods to allow a read-only or a read-write access to the collection of a container object's related objects is shown in accordance with one embodiment of the present invention. At block 800, a plurality of automatic key-value collection proxies may be enabled. A key-value coding method may be detected at block 805. A read-only or read-write access to one or more related objects to the first object 120, such as a container object that contains one or more properties may be allowed at block 810. At block 815, a key-value collection proxy corresponding to the key-value coding method may be returned.

Advantageously, the provision of these KVC methods and KVC collection proxy objects saves writing of a relatively large amount of code when manipulating objects using the application programming interface. For example, in the key-value binding module 210 based on a binding feature which uses the key-value coding module 200 and the key-value observing module 205, user interface programming may be done with a minimum of coding, and necessary code is highly usable.

While the invention has been illustrated herein as being useful in an object-oriented based computer environment, it also has application in other building block based programming environments. For example, the present invention may have application in any environment where two or more programming building blocks or software entities are interconnected and capable of communicating with one another.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for providing an application programming interface in an object-oriented programming platform, the method comprising:
   in response to a first message received at a first object that contains one or more properties, creating a second object that responds to a second message sent thereto responsive to sending of said first message to said first object;
   returning said second object;
   implementing one or more primitive methods in said first object to enable implementation of at least one method associated with said second object; and
   providing a plurality of automatic key-value coding proxies for return by corresponding key-value coding methods to allow at least one of read-only and read-write access to one or more related objects to said first object.

2. A method, as set forth in claim 1, further comprising:
   receiving a string for a method sent by an object, said string identifying a property of said first object from said one or more properties; and
   in response to said string, returning a value for the property for said first object.

3. A method, as set forth in claim 1, further comprising:
   receiving a key that indicates a property of said first object having a set of associated methods, each method having a name; and
   searching the names of the set of associated methods based on said key to identify a method with a same name as said key.

4. A method, as set forth in claim 1, further comprising:
   receiving a key that indicates a property of said first object having a set of associated methods, each method having a name; and
   searching the names of the set of associated methods based on said key to identify a naming pattern.

5. A method, as set forth in claim 1, further comprising:
   returning a collection when an object calls said first object for a value of a key.

6. A method as set forth in claim 5, further comprising:
   receiving said first message at said collection to perform an operation with said collection; and
   forwarding said first message to said first object.

7. A method, as set forth in claim 5, wherein returning an array further including:
   returning a collection proxy object.

8. A method, as set forth in claim 1, further comprising:
implementing one or more primitive methods in said first object to enable implementation of a plurality of methods associated with said second object, wherein said second object has an array class associated therewith.

9. A method, as set forth in claim 8, further comprising:
implementing at least two primitive methods of said one or more primitive methods for said first object, wherein said first object is a container object.

10. A method, as set forth in claim 1, further comprising:
implementing a set-accessor method named according to a predefined pattern for a class associated with said first object.

11. A method, as set forth in claim 1, further comprising:
providing a first method whose name follows a pattern;
associating said first method to a class associated with said second object; and
in response to a second method asking for a value for a key, using said first method to obtain contents out of said second object.

12. A method, as set forth in claim 1, further comprising:
allowing said second object to access one or more related objects to said first object even when said one or more related objects are not stored in a standard collection.

13. A method, as set forth in claim 12, further comprising:
identifying a mutating message declared by a standard collection class; and
causing said second object to respond to said mutating message.

14. A method, as set forth in claim 8, further comprising:
providing an option to use other methods named according to one or more predefined patterns and are equivalent to said one or more primitive methods.

15. An article comprising a computer readable storage medium storing instructions that, when executed, cause a processor-based system to:
in response to a first message received at a first object that contains one or more properties, create a second object that responds to a second message sent thereto responsive to sending of said first message to said first object;
return said second object;
implement one or more primitive methods in said first object to enable implementation of at least one method associated with said second object; and
provide a plurality of automatic key-value coding proxies for return by corresponding key-value coding methods to allow at least one of read-only and read-write access to one or more related objects to said first object.

16. An article, as set forth in claim 15, comprising a medium storing instructions that, when executed, cause a processor-based system to:
receive a string for a method sent by an object, said string identifies a property of said first object from said one or more properties; and
in response to said string, return a value for the property for said first object.

17. An article, as set forth in claim 15, comprising a medium storing instructions that, when executed, cause a processor-based system to:
receive a key that indicates a property of said first object having a set of associated methods, each method having a name; and
search the names of the set of associated methods based on said key to identify a method with a same name as said key.

18. An article, as set forth in claim 15, comprising a medium storing instructions that, when executed, cause a processor-based system to:
receive a key that indicates a property of said first object having a set of associated methods, each method having a name; and
search the names of the set of associated methods based on said key to identify a naming pattern.

19. An article, as set forth in claim 15, comprising a medium storing instructions that, when executed, cause a processor-based system to:
return a collection when an object calls said first object for a value of a key.

20. An article, as set forth in claim 19, comprising a medium storing instructions that, when executed, cause a processor-based system to:
receive said first message at said collection to perform an operation with said collection; and
forward said first message to said first object.

21. An article, as set forth in claim 19, comprising a medium storing instructions that, when executed, cause a processor-based system to:
return a collection proxy object.

22. An article, as set forth in claim 15, comprising a medium storing instructions that, when executed, cause a processor-based system to:
implement one or more primitive methods in said first object to enable implementation of a plurality of methods associated with said second object, wherein said second object having an array class associated therewith.

23. An article, as set forth in claim 22, comprising a medium storing instructions that, when executed, cause a processor-based system to:
implement at least two primitive methods of said one or more primitive methods for said first object, wherein said first object is a container object.

24. An article, as set forth in claim 15, comprising a medium storing instructions that, when executed, cause a processor-based system to:
implement a set-accessor method named according to a predefined pattern for a class associated with said first object.

25. An article, as set forth in claim 15, comprising a medium storing instructions that, when executed, cause a processor-based system to:
provide a first method whose name follows a pattern;
associate said first method to a class associated with said second object; and
in response to a second method asking for a value for a key, use said first method to obtain contents out of said second object.

26. An article, as set forth in claim 15, comprising a medium storing instructions that, when executed, cause a processor-based system to:
allow said second object to access one or more related objects to said first object even when said one or more related objects are not stored in a standard collection.

27. An article, as set forth in claim 26, comprising a medium storing instructions that, when executed, cause a processor-based system to:
identify a mutating message declared by a standard collection class; and
cause said second object to respond to said mutating message.

28. An article, as set forth in claim 22, comprising a medium storing instructions that, when executed, cause a processor-based system to:
provide an option to use other methods named according to one or more predefined patterns and are equivalent to said one or more primitive methods.

29. An object-oriented computing system, the system comprising:
a processor;
a memory coupled to said processor, said memory storing a data file structure including an identification of a first and a second object in a software program, said second object contains one or more properties; and
an interface to, in response to a first message received at the first object that contains one or more properties, create the second object that responds to a second message sent thereto responsive to sending of said first message to said first object, return said second object, and implement one or more primitive methods in said first object to enable implementation of at least one method associated with said second object and to provide a plurality of automatic key-value coding proxies for return by corresponding key-value coding methods to allow at least one of read-only and read-write access to one or more related objects to said first object.

30. The object-oriented computing system of claim 29, wherein said software program is an operating system program and said memory storing a key-value coding module that provides access to one or more properties of an object using a generic application programming interface that identifies said one or more properties by a key.

31. The object-oriented computing system of claim 29, wherein said interface comprises:
a window that is displayed on a display device of the computing system.

32. The object-oriented computing system of claim 29, wherein said data file structure comprises:
a database in which each object of said first and second objects forms the basis for a record in the database, and each record contains fields which respectively identify pointers and methods with which the record is associated.

33. An application programming interface for managing relationships of objects in an object-oriented computing system, the application programming interface comprising:
means for, in response to a first message received at a first object that contains one or more properties, creating a second object that responds to a second message sent thereto responsive to sending of said first message to said first object;
means for returning said second object;
means for implementing one or more primitive methods in said first object to enable implementation of at least one method associated with said second object; and
means to provide a plurality of automatic key-value coding proxies for return by corresponding key-value coding methods to allow at least one of read-only and read-write access to one or more related objects to said first object.

34. An application programming interface, as set forth in claim 33, further comprising:
means for receiving a string for a method sent by an object, said string identifies a property of said first object from said one or more properties; and
means for returning a value for the property for said first object in response to said string.

35. An application programming interface, as set forth in claim 33, further comprising:
means for receiving a key that indicates a property of said first object having a set of associated methods, each method having a name; and
means for searching the names of the set of associated methods based on said key to identify a method with a same name as said key.

36. An application programming interface, as set forth in claim 33, further comprising:
means for implementing one or more primitive methods in said first object to enable implementation of a plurality of methods associated with said second object, said second object having an array class associated therewith.

37. An application programming interface, as set forth in claim 36, further comprising:
means for implementing at least two primitive methods of said one or more primitive methods for said first object, wherein said first object is a container object.

38. An application programming interface, as set forth in claim 33, further comprising:
means for implementing a set-accessor method named according to a predefined pattern for a class associated with said first object.

* * * * *